Patented Aug. 31, 1926.

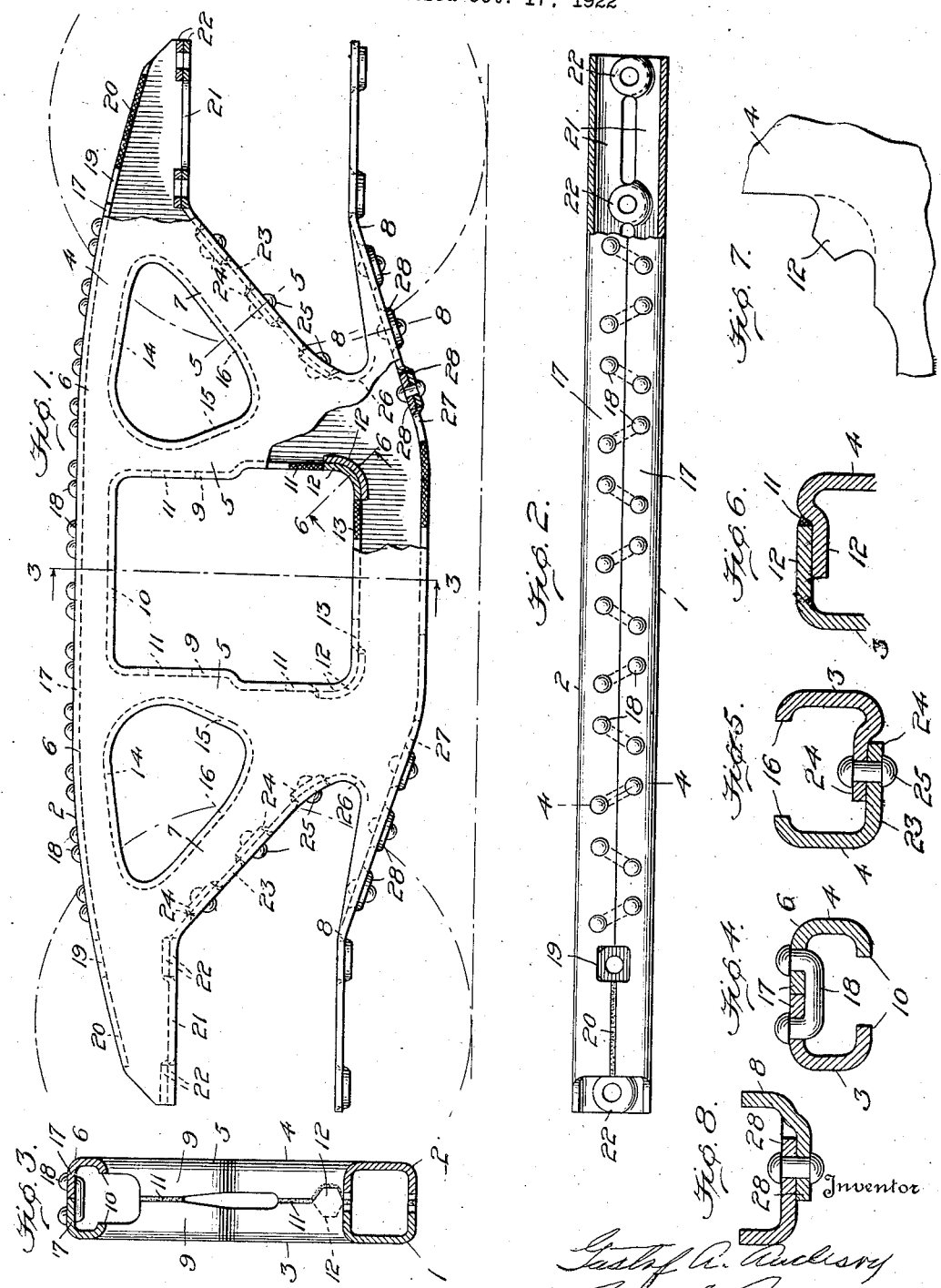

1,597,946

UNITED STATES PATENT OFFICE.

GUSTAF A. ANDERSON, OF BALTIMORE, MARYLAND, ASSIGNOR, BY MESNE ASSIGNMENTS, TO THE SYMINGTON COMPANY, A CORPORATION OF MARYLAND.

TRUCK SIDE FRAME.

Application filed October 17, 1922. Serial No. 595,094.

My invention relates to side frames for car trucks and has been primarily designed to provide a construction which is very strong and stiff but comparatively light in weight, and in which costs incident to maintenance are reduced to a minimum.

The principal feature of the invention, generally stated, resides in forming a car truck side frame with an outer wall of sheet metal and an inner wall of similar material, each of said walls being formed from separate blanks or sheets united at a plurality of points, and each having a plurality of truck column portions, a plurality of top arch bar portions, a plurality of bottom arch bar portions, and a plurality of pedestal tie bar portions.

Particularly stated, my present invention has for an object the production of a car truck side frame from two sheets or blanks of metal, each of said sheets having truck column portions, top and bottom arch bar portions, and pedestal tie bar portions, said sheets being adapted to be abutted and united at their top edges by means of a plurality of transversely disposed U-shaped rivets arranged in the form of and constituting a continuous lacing, and also connected by longitudinal welds adjacent the respective ends of said lacing.

The invention has for a further object the provision of means for effectively uniting the opposite sheets or blanks at a plurality of points by providing overlapping tabs or lugs, some of which may be riveted together and others of which may be welded.

A further object of the invention is to provide a car truck side frame formed of complementary sheet metal sections, each provided with inwardly extending stiffening flanges adapted to form the truck columns, portions of the respective flanges being abutted and welded, and other portions of said flanges being overlapped and welded at the corner bends uniting the truck columns with the spring plank seat portion.

A still further feature of the invention consists in providing the lower inwardly extending flanges of the lower arch bar and pedestal tie bar portions of the complementary metal sheets with spaced tabs or lugs adapted to be fitted one upon the other and joined together by means of rivets, the intermediate portion of the inturned flanges beneath the bolster opening being welded and spaces being left intermediate said welds and overlapped lugs whereby rain, moisture and other substances can drain through.

A still further object of the invention resides in providing overlapping tabs or lugs with inwardly extending stiffening flanges at the bottom portion of the top arch bars arranged over the journal boxes, and overlapping tabs or lugs on the pedestal tie bar portions extending beneath the journal boxes.

There are other features of the invention relating to the particular construction of the parts, and the method of manufacture, as will more fully appear hereinafter.

In the drawings chosen to illustrate my invention, the scope whereof is pointed out in the claims:—

Figure 1 is a view partly in side elevation and partly in vertical section of a car truck side frame embodying the invention, the wheels of the truck being shown in dotted lines.

Figure 2 is a top plan view of the side frame with a portion thereof shown in horizontal section.

Figure 3 is a vertical transverse sectional view through the side frame on the line 3—3 of Figure 1.

Figure 4 is a detail transverse sectional view on line 4—4 of Fig. 2 through the top arch bar portion, illustrating the U-shaped rivet comprising the lacing for the sheet metal sections.

Figure 5 is a detail transverse sectional view on the line 5—5 of Figure 1 through the diagonal tension member or bottom arch bar.

Figure 6 is a detail cross sectional view on the line 6—6 of Figure 1 through the overlapped tabs or lugs welded around the corner bend uniting the truck columns and spring plank seat portion.

Figure 7 is a detail view of the tab or lug formed on the truck column corner portion of one of the sheet metal planks.

Figure 8 is a detail transverse sectional view on the line 8—8 of Figure 1 through the overlapped lugs of the pedestal tie bar portions.

Referring to the drawings in which corresponding reference characters designate similar parts in the several views, my improved side frame is formed of complementary sheet metal members or sections 1 and 2, the former constituting the inner wall 3 and the latter forming the outer wall 4 of the side frame. The inner and outer walls are arranged in spaced relation and are each formed of a single continuous sheet metal blank. Each of said blanks is provided with a plurality of truck column portions 5, a plurality of top arch bar portions 6, a plurality of bottom arch bar portions 7, and a plurality of pedestal tie bar portions 8, the truck column portions being spaced apart to form a bolster opening between them. The parts of the pedestal tie bar portions of the side frame which are located between the truck columns and the adjacent journal boxes (not shown) may advantageously be of tapering form, their greatest cross-sectional areas being at their junctures with the respective truck columns. Such a construction not only imparts to the side frame increased strength to resist vertical loads, but it also reinforces and supports the lower ends of the truck column so that failure of the side frame at these points is reduced to a minimum.

The bottom arch bar portions or diagonal tension members of the inner and outer walls of the side frame, which extend at an angle to the top arch bar portions and to the pedestal tie bar portions, merge with and are integrally united to said top arch bar portions of the respective walls above the journal boxes at the ends of the truck.

Each of the continuous sheet metal blanks is formed with stiffening flanges adapted to extend inwardly of each other, said flanges serving to effectually brace the side frame against transverse and other thrusts. Portions of the stiffening flanges are utilized to unite the blanks or wall portions of the side frame by a welding operation. Moreover, his dispositioning of stiffening flanges on one side only of the respective walls of the truck enables said flanges to be made of maximum width, thereby increasing the rigidity and strength of the entire side frame. Each of the stiffening flanges provided on each metal blank preferably extends not more than one half the distance toward the opposite wall of the truck frame. This construction is desirable because the production of a wide flange at certain points of the structure would result in stretching of the metal, thereby reducing its thickness and weakening the side frame at those points, whereas by forming the flanges of equal width the stretching of the metal is minimized and, moreover, the reduced section is located at the midline or center line of the side frame where the strength requirement is least, instead of occurring nearer the side walls of the frame where the strength requirement is greatest.

Each complementary metal blank is provided with inwardly extending stiffening flanges 9 which border the adjacent sides of the truck column portions 5 of the respective wall sections. They preferably merge into and are united at their upper ends by less pronounced flanges 10 which stiffen the central or intermediate part of the top arch bar portions.

Vertical portions of the inwardly extending flanges 9 are abutted and welded at intervals, as indicated at 11. At the corner bends uniting the truck column portions with the portion of the flanges 9 forming the spring plank seat, the said flanges are formed with overlapping tabs or lugs 12, one of said tabs being depressed sufficiently to receive the adjacent overlapping tab in a transverse plane substantially flush as shown in Figures 3 and 6. The lower vertical welds indicated at 11 are continued around the edge joint of said overlapping tabs thereby forming strong angle welds terminating in the horizontally welded portions 13 uniting the inwardly extending flanges 9 at the bottom of the bolster opening. The overlapping tab portions are preferably designed to extend around the corner bends.

The top arch bar portions 6 of the sheet metal or wall sections are preferably reinforced by oppositely inwardly extending flanges 14. The outer edge of each bolster column is likewise preferably reinforced by inwardly projecting flanges 15, while the lower arch bars 7 may advantageously be provided along their upper edges with similar stiffening flanges 16, the said flanges 14, 15 and 16 being continuous and forming substantially triangular openings or windows in the side frame.

The top portion of the side frame is preferably arranged in the form of a cambered compression member, the inwardly extending flanges 17 being provided on each complementary sheet and arranged to meet on a line passing through the center of the side frame. The flanges 17 are abutted intermediate the ends of the truck, said abutted portions being firmly united by means of a form of rivet lacing clearly shown in Figure 2. U-shaped rivets 18 are preferably provided, the opposite ends of said rivets projecting upwardly through openings in the adjacent flanges and being headed over, as shown in Figure 4. The main portion or shank of the rivet underlies the joint formed by the abutting edges of the flanges and serves as a strong tie member between the separate sheet metal blanks forming the truck side walls. The rivets are transversely arranged and are alternatively slanted in opposite directions across the joint to provide for the staggering of the heads in producing a strong and durable connection. The rivet lacing preferably terminates short of the journal box bolt openings 19 arranged near the ends of the side frame.

The end portions of the inwardly extending flanges 17 are preferably united by welding their adjacent edges a distance extending from the journal box bolt openings 19 to the ends of said flanges. The welding of the ends adjacent the rivet lacing is indicated by the numeral 20 in Figures 1 and 2. The lower edges of the top arch bar portions adapted to overlie the journal boxes are each formed with inturned stiffening flanges 21, each of said flanges being provided at intervals with horizontal tabs or lugs 22 adapted to be fitted one upon the other, as clearly shown at the right hand end of Figures 1 and 2. One series of said tabs is preferably offset to provide for the reception of an adjacent overlapping tab in a horizontal and flush surface which is designed to contact the top of the journal box, as will be understood. Alined openings through which pass the journal box bolts are provided in the tabs or lugs. The lugs or tabs are preferably welded together to more firmly unite the sheet metal sections at these points.

The bottom arch bar portions 7 and more particularly the lower edges thereof, are provided with inwardly extending stiffening flanges 23, said flanges being provided at intervals with overlapping tabs or lugs 24. Rivets 25 pass through and firmly unite the tabs which are preferably arranged to overlap each other in such a manner as to provide a substantially flush bottom surface for the said arch bar portions. One series of lugs may be offset, as shown in Figure 5, to accomplish this result. The rivet connection of the lower arch bar portion extends to the juncture of said arch bar portions with the pedestal tie bar portions 8, the inwardly projecting stiffening flanges 23 extending around the said juncture, as indicated by the numeral 26 in Figure 1.

The pedestal tie bar portions 8 of the complementary sheet metal sections are each provided with inwardly extending stiffening flanges 27, said flanges extending beneath the lower arch bar portions and bolster opening and terminating in the substantially flat ends of said tie bar portions adapted to be connected to the underside of the journal box by any desired means, for example, the usual journal box bolts (not shown). Overlapping tabs or lugs 28 are provided on said flanges, said tabs being arranged at intervals and extending from points beneath the truck column outwardly to the ends of the tie bars. One series of said tabs is offset to provide for the meeting of the flanges 27 in a substantially flat plane, as shown in Figure 8, with the interior surface of the flanges flush.

It will also be perceived that a sheet metal car truck side frame and more especially the corners uniting the truck column and spring plank seat may be effectively produced by abutting portions of the stiffening flanges and welding the same, and overlapping other portions of the flanges at the corner and welding the edges thereof at the corner bend.

It will be noted that a truck frame constructed in accordance with my present invention not only has the merit of being constructed of light and reliable wrought metal, but its parts are so formed and constructed that the points subjected to greatest strain under service conditions are rendered exceedingly strong.

I claim:—

1. A car truck side frame involving oppositely arranged separate metal sheets united in a plane passing through the center of the side frame and arranged to form spaced outer and inner walls, each of said walls having a plurality of truck column portions, a plurality of top arch bar portions, a plurality of bottom arch bar portions, and a plurality of pedestal tie bar portions.

2. A car truck side frame involving two oppositely arranged wrought metal members united to form spaced apart inner and outer flanged walls, each of said walls having a plurality of truck column portions, a plurality of top arch bar portions, a plurality of bottom arch bar portions, and a plurality of pedestal tie bar portions, and abutting flanges on said arch bar portions.

3. A car truck side frame involving a plurality of metal sheets united in a vertical longitudinal plane passing through the center of the side frame and arranged to form spaced outer and inner walls, each of said walls having a plurality of truck column portions, a plurality of top arch bar portions, a plurality of bottom arch bar portions, and a plurality of pedestal tie bar portions.

4. A car truck side frame involving a plurality of metal sheets united to form spaced inner and outer walls, each of said walls having a plurality of truck column portions, a plurality of top arch bar portions, a plurality of bottom arch bar portions, and a plurality of pedestal tie bar portions; and means including a plurality of U-shaped rivets adapted to firmly connect said metal sheets.

5. A car truck side frame involving a plurality of metal sheets united to form spaced inner and outer walls, each of said walls having a plurality of truck column portions, a plurality of top arch bar portions, a plurality of bottom arch bar portions, and a plurality of pedestal tie bar portions; and a plurality of rivets firmly connecting said metal sheets.

6. A car truck side frame involving a plurality of metal sheets united to form spaced inner and outer walls, each of said walls having a plurality of truck column portions, a plurality of top arch bar portions, a plurality of bottom arch bar portions, and a plurality of pedestal tie bar portions; a plurality of rivets firmly connecting the upper edges of said metal sheets, and means including a plurality of welds for connecting other portions of said metal sheets.

7. A car truck side frame involving a plurality of metal sheets united to form spaced inner and outer walls, each of said walls having a plurality of truck column portions, a plurality of top arch bar portions, a plurality of bottom arch bar portions, and a plurality of pedestal tie bar portions; rivet means connecting the intermediate upper portion of said metal sheets, and weld means connecting said metal sheets together at each end of said rivet means.

8. A car truck side frame involving a plurality of metal sheets united to form spaced inner and outer walls, each of said walls having a plurality of truck column portions, a plurality of top arch bar portions, a plurality of bottom arch bar portions, and a plurality of pedestal tie bar portions; and rivet means adapted to transversely lace a part of the upper portion of said metal sheets together.

9. A car truck side frame involving a plurality of metal sheets united to form spaced inner and outer walls, each of said walls having a plurality of truck column portions, a plurality of top arch bar portions, a plurality of bottom arch bar portions, and a plurality of pedestal tie bar portions; means including a plurality of transversely arranged rivets adapted to lace an intermediate section of the upper portions of said metal sheets, and weld means uniting said metal sheets adjacent said rivet lacing.

10. A car truck side frame involving a pair of wrought metal sheets shaped to provide spaced outer and inner walls, each of said walls having a plurality of truck column portions, a plurality of top arch bar portions, a plurality of bottom arch bar portions, and a plurality of pedestal tie bar portions, said truck column portions being provided with stiffening flanges adapted to be welded at spaced intervals and having projections adapted to be overlapped and welded at the lower corners of said columns.

11. A wrought metal car truck side frame involving spaced outer and inner walls, each of said walls having a plurality of truck column portions, a plurality of top arch bar portions, a plurality of bottom arch bar portions, and a plurality of pedestal tie bar portions; said truck column portions being provided with inwardly extending flanges, and projections provided on said flanges, said projections being adapted to be overlapped and welded.

12. A wrought metal car truck side frame involving spaced outer and inner walls, each of said walls having a plurality of truck column portions, a plurality of top arch bar portions, a plurality of bottom arch bar portions, and a plurality of pedestal tie bar portions; said truck column portions being formed with overlapping portions welded together at the corner bends uniting the truck column portions and the spring plank seat portion of the truck, adjacent portions of said frame being butt welded.

13. A wrought metal car truck side frame involving spaced outer and inner walls, each of said walls having a plurality of truck column portions, a plurality of top arch bar portions, a plurality of bottom arch bar portions, and a plurality of pedestal tie bar portions; said truck column portions being provided with overlapped flanges welded together and extending around the angle formed at the juncture of the truck columns and spring plank seat portion of the truck, portions of said flanges being in alinement.

14. A wrought metal car truck side frame involving metal sheets forming spaced outer and inner walls, each of said walls having a plurality of truck column portions, a plurality of top arch bar portions, a plurality of bottom arch bar portions, and a plurality of pedestal tie bar portions, said bottom arch bar portions being provided with inwardly extending flanges having portions thereof adapted to abut and to be welded.

15. A wrought metal car truck side frame involving spaced outer and inner walls, each of said walls having a pluralilty of truck column portions, a plurality of top arch column portions, a plurality of top arch bar portions, a plurality of bottom arch bar portions, and a plurality of pedestal tie bar portions, said bottom arch bar portions being formed with non-continuous overlapped portions adapted to be connected.

16. A wrought metal car truck side frame involving spaced outer and inner walls, each of said walls having a plurality of truck column portions, a plurality of top arch bar portions, a plurality of bottom arch bar portions, and a plurality of pedestal tie bar portions, said bottom arch bar portions having a plurality of overlapping portions arranged at spaced intervals and adapted to be connected.

17. A wrought metal car truck side frame involving spaced outer and inner walls, each of said walls having a plurality of truck column portions a plurality of top arch bar portions, a plurality of bottom arch bar portions, and a plurality of pedestal tie bar portions, said bottom arch bar portions having a plurality of overlapping portions, and rivet means connecting said overlapped portions.

18. A wrought metal car truck side frame involving spaced outer and inner walls, each of said walls having a plurality of truck column portions, a plurality of top arch bar portions, a plurality of bottom arch bar portions, and a plurality of pedestal tie bar portions, a plurality of perforated overlapped portions provided on the lower edges of the bottom arch bar portions and arranged to extend over the journal boxes, rivets passing through certain of the perforated overlapped portions, and journal box bolts passing through other of said perforated overlapped portions.

19. A wrought metal car truck side frame involving spaced outer and inner walls, each of said walls having a plurality of truck column portions, a plurality of top arch bar portions, a plurality of bottom arch bar portions, and a plurality of pedestal tie bar portions; inwardly extending flanges provided on the bottom arch bar portions, and projections extending from said flanges, said projections being overlapped and connected.

20. A wrought metal car truck side frame involving spaced outer and inner walls, each of said walls having a plurality of top arch bar portions, a plurality of bottom arch bar portions, and a plurality of pedestal tie bar portions; said pedestal tie bar portions having a plurality of overlapped portions arranged at spaced intervals upon at least one side of the truck column portions, and means connecting said overlapped portions.

21. A wrought metal car truck side frame involving spaced outer and inner walls, each of said walls having a plurality of top arch bar portions, a plurality of bottom arch bar portions, and a plurality of pedestal tie bar portions; said pedestal tie bar portions having a plurality of overlapped portions, and rivet means connecting said overlapped portions.

22. A wrought metal car truck side frame involving spaced outer and inner walls, each of said walls having a plurality of top arch bar portions, a plurality of bottom arch bar portions, and a plurality of pedestal tie bar portions; a plurality of overlapped portions provided on the lower edges of said pedestal tie bar portions, and rivets extending therethrough and connecting said overlapped portions.

23. A wrought metal car truck side frame involving spaced outer and inner walls, each of said walls having a plurality of top arch bar portions, a plurality of bottom arch bar portions, and a plurality of pedestal tie bar portions; a plurality of perforated overlapped portions provided on said pedestal tie bar portions and arranged to extend beneath the journal box, rivets passing through certain of the perforated overlapped portions, and journal box bolts passing through other of said perforated overlapped portions.

24. A wrought metal car truck side frame involving spaced outer and inner walls, each of said walls having a plurality of top arch bar portions, a plurality of bottom arch bar portions, and a plurality of pedestal tie bar portions; inwardly extending flanges provided on said pedestal tie bar portions, and projections extending from said flanges, said projections being adapted to be overlapped and connected.

25. A car truck side frame comprising at least two metal members united in spaced relation and shaped to form a bolster opening, means including a plurality of rivets for uniting said members at the top and bottom thereof, and weld means uniting said members adjacent the bolster opening.

26. A car truck side frame including two flanged sheet metal members united to form spaced walls provided with a bolster opening, the flanges of said members when united extending in opposite directions, rivet means connecting portions of said members, and weld means connecting other portions of said members.

27. The method of manufacturing a wrought metal car truck side frame which consists in forming two symmetrical blanks each having corresponding side frame portions, bending portions of each of said blanks to form flanges projecting toward each other, and uniting adjacent portions of said blanks by means of a plurality of stitch rivets.

28. The method of manufacturing a wrought metal car truck side frame which consists in forming two symmetrical blanks each having corresponding side frame members, bending portions of each of said blanks to form flanges projecting toward each other, uniting portions of said flanges by rivets, and welding other portions of said flanges.

In testimony whereof I affix my signature.

GUSTAF A. ANDERSON.